United States Patent [19]
Garey

[11] 3,959,987
[45] June 1, 1976

[54] SELF-ENGAGING AND ALIGNING SHAFT COUPLING

[75] Inventor: Robert B. Garey, San Jose, Calif.

[73] Assignee: Subsea Equipment Associates Limited, Hamilton, Bermuda

[22] Filed: May 8, 1974

[21] Appl. No.: 467,879

[52] U.S. Cl. .................... 64/8; 64/9 R; 64/23
[51] Int. Cl.² .......................... F16D 3/02
[58] Field of Search .......... 64/8, 6, 23, 1 R, 7, 64/31, 4

[56] References Cited
UNITED STATES PATENTS

| | | | |
|---|---|---|---|
| 1,286,945 | 12/1918 | Coates | 64/8 |
| 1,802,899 | 4/1931 | Knight | 64/8 |
| 2,823,527 | 2/1958 | Belden et al. | 64/23 |
| 2,893,222 | 7/1959 | Albedyhl et al. | 64/9 R |
| 3,299,670 | 1/1967 | Allbeson et al. | 64/8 |
| 3,779,037 | 12/1973 | Petros et al. | 64/23 |

FOREIGN PATENTS OR APPLICATIONS

| | | | |
|---|---|---|---|
| 654,264 | 4/1929 | France | 64/8 |
| 624,166 | 2/1959 | Italy | 64/8 |

*Primary Examiner*—Samuel Scott
*Assistant Examiner*—Randall Heald
*Attorney, Agent, or Firm*—Ernest F. Marmorek

[57] ABSTRACT

A coupling for use in self-engaging and subsequently aligning two portions of a transmission for remote coupling of the portions even when the portions are not aligned.

10 Claims, 4 Drawing Figures

SELF-ENGAGING AND ALIGNING SHAFT COUPLING

BACKGROUND OF THE INVENTION

The invention relates to a transmission coupling. The invention relates more particularly to a coupling where access is difficult such as in subsea well head operations.

In order to operate, for example, under sea well head control apparatus which is secured to the well head itself, operating means are suspended from cables attached to vessels floating above the well head. In order to operate the under sea well head control apparatus, the operating means must be coupled to the apparatus. As the operating personnel are on the vessel above the well head and the operating means are suspended below the vessel by cables, proper mechanical alignment between the operating means and the well head control apparatus is often difficult, if not impossible to accomplish.

SUMMARY OF THE INVENTION

One of the principal objects of the invention is to provide a reliable mechanical connection for torque transmission. Another object of the invention is to provide a connection between a driven portion and a driving portion of a transmission even when the portions are not aligned. Still another object of the invention is to provide simplicity of connection. And still another object of the invention is to provide guide means to facilitate coupling even when there is considerable misalignment between the portions of the transmission. A still further object of the coupling of the instant invention is to provide constant torque transmission even where the portions of the transmission may be non-aligned.

Further objects and advantages of the invention will be set forth in part in the following specification and in part will be obvious therefrom without being specifically referred to, the same being realized and attained as pointed out in the claims hereof. Other objects of the invention will in part be obvious and will in part appear hereinafter.

With the above and other objects of the invention in view, the invention consist in the novel construction, arrangement and combination of various devices, elements and parts, as set forth in the claims hereof, certain embodiments of the same being illustrated in the accompanying drawings and described in the specification.

BRIEF DESCRIPTION OF THE DRAWINGS

For a fuller understanding of the nature and object of the invention, reference should be had to the following detailed description, taken in connection with the accompanying drawings, in which.

Figure 1:
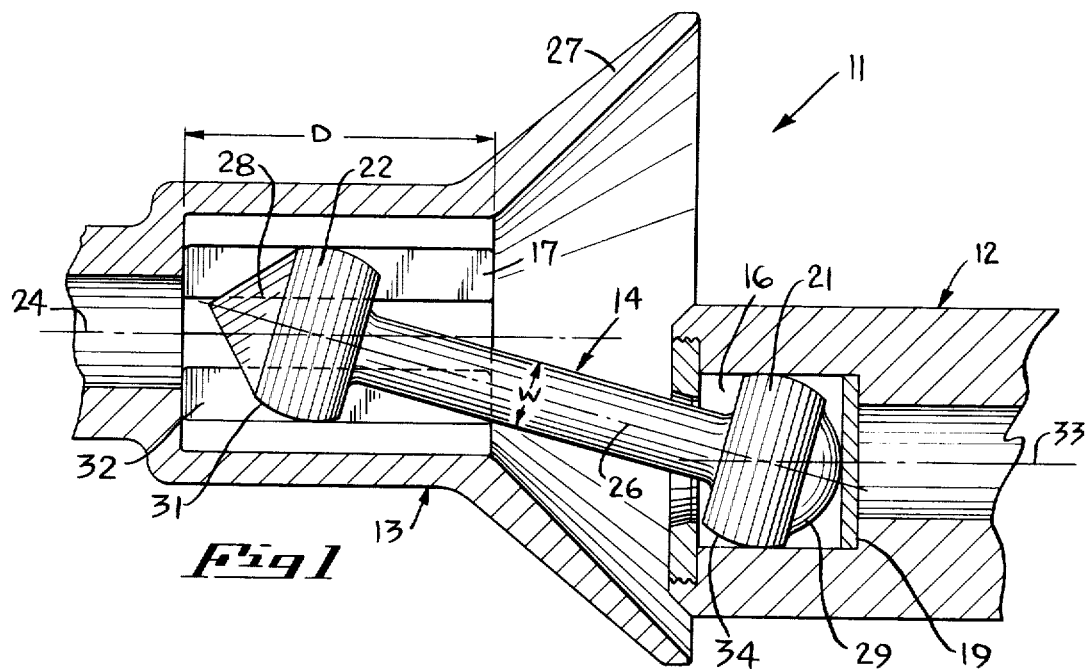
FIG. 1 is a fragmentary sectional view of a transmission coupling in accordance with the invention, with the plug and socket non-aligned.

The foregoing and other objects of the invention will be best understood from the following description of exemplification thereof, reference being had to the accompanying drawings wherein:

DESCRIPTION OF THE PREFERRED EMBODIMENTS

In carrying the invention into effect in the embodiments which have been selected for illustration in the accompanying drawings and for description in the specification, and referring now particularly to FIGS. 1–4, a coupling 11, is provided to transmit torque from a first driving portion or connecting means 12 to a second driven portion 13 through an intermediate plug 14 formed with an elongated axis 26.

Figure 2:
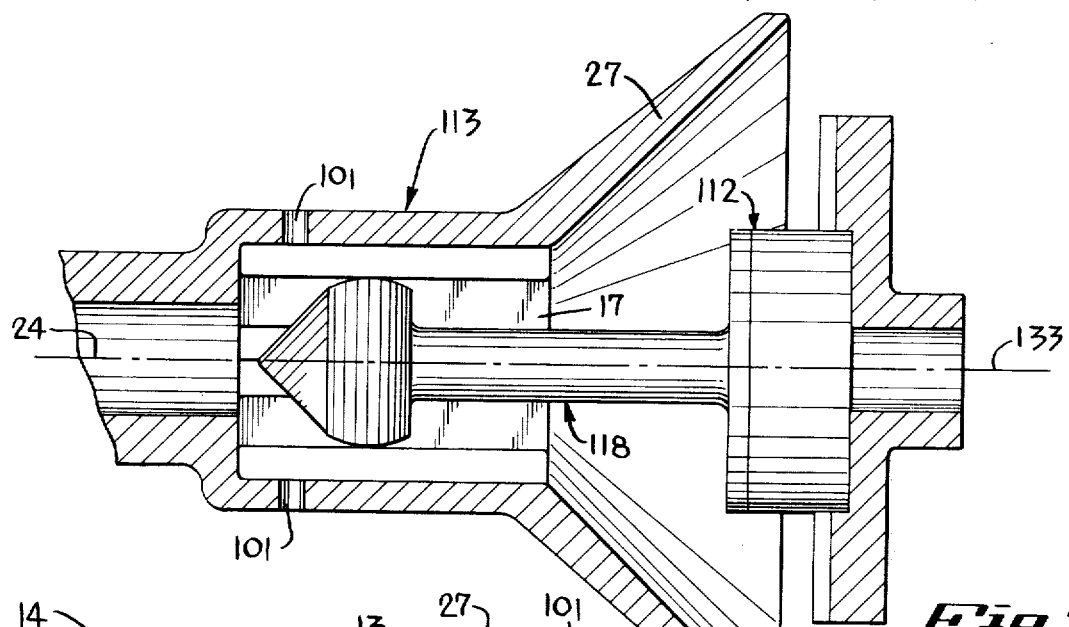
FIG. 2 is a sectional view similar to FIG. 1, but showing a modification, and showing the plug and socket aligned.
Figure 3:
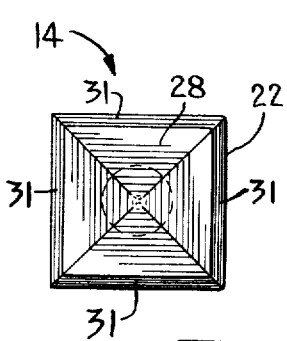
FIG. 3 is an end elevational view of the front portion of the plug of FIG. 1.

The connection means may be an Oldham type coupling 112 as shown in FIG. 2; or it may comprise, as shown in FIG. 1, a prismatic cavity 16 having for example a square shape in which there is retained a matching crowned prismatic rear end portion 21 having a crowned surface 34, at the rear portion of the plug 14. A thrust button 29 is provided at the rear of the plug 14 to help prevent binding of the plug 14 while permitting the plug 14 to oscillate. The thrust button 29 bears against a plate 19.

A transmission means such as a crowned prismatic for example, quadratic, outer surface 31 on the front portion 22 of the plug 14, and a matching prismatically shaped cross-section for the inner surface 32 of a socket 17 as provided in the driven portion 13, is provided intermediate the plug 14 and the socket 17 by which torque is transmitted from the plug 14 to the socket 17.

Figure 4:
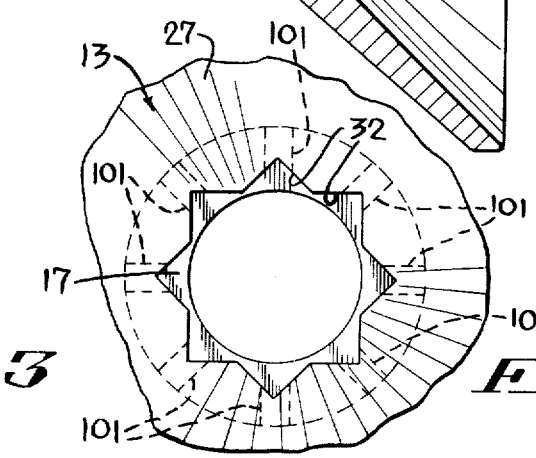
FIG. 4, is an elevational view of the socket.

In the preferred embodiment, the front portion 22 of the plug 14 has a frontal taper 28 and a crowned prismatic for example square or quadratic portion 22. The matching prismatically shaped cross-section as shown in the exemplification of FIG. 4 is an eight-pointed star. The star shape is formed by two squares which are displaced for about 45° from one another. The socket 17 terminates in a suitable shaft hub (not shown). The depth "D" of the socket 17 is measured along an elongated central axis 24. The plug 14 has a width "w". The depth "D" of the socket 17 and the width "w" of the plug 14 are such that the deeper the plug penetrates into the socket the closer the axis 26 of the plug 14 and the axis 24 of the socket 17 will be aligned.

As shown in FIG. 2, holes 101 may be provided in the driven portion 113 to communicate interiorly with the socket 17 to permit the outflow of water and debris from the socket 17 when the plug 118 enters the socket 17.

Guide means 27 are provided on the driven portion 13 to facilitate the plug engagement with the socket especially when the longitudinal axes 24, 26 and 33 are non-aligned.

For use in undersea operations, the coupling 11 should be made of a suitable, water resistant material.

OPERATION OF THE INVENTION

The operation of the above described embodiments of the invention is as follows:

In operation of the preferred embodiment, the socket 17 is mounted in the driven portion or connecting means 13 to be turned and the plug 14 is mounted on the remotely controlled driving portion 12. The driver (not shown) with the plug 14 connected to it by a connecting means 12 or 112 is brought into position adjacent to the socket 17. The plug 14 is then advanced, in a direction paralled to axis 24, towards the socket 17.

The front portion 28 of the plug may contact the guide surfaces 27 of the driven portion 13 and be directed into the socket 17 even though the plug axis 26 and socket axis 24 are not aligned. The crowned prismatic front portion 22 of the plug 14 can interconnect with the socket 17 even though their respective axes 26 and 24 are not completely aligned as shown in FIG. 1. The connecting means 12 or 112 provide two degrees of freedom normal to the axis 33 of the driving means 12 thus further axial movement of the driving means 12 causes the plug 14 to be cammed towards the matching socket 17, at the same time the prismatic surface 31 of the plug 14 seeks to match the face on the socket 17 rotating the plug 14 into alignment with the socket 17 (see FIGS. 3 and 4). Should the square on the plug 14 be balanced on a corner, the plug 14 will then interconnect in the square portion of the socket 17 cross-section (FIG. 4) which is offset from the prismatic surfaces 31 by 45°.

When the plug 14 is engaged with the star-shaped socket (FIG. 4), power is applied to the plug 14 through the connection means 12 or 112. The Oldham coupling 112 accommodates an offset between the axis 26 of the plug 14 and the axis 133 of the driving portion 112; while the crowned prismatic front portion 22 of the plug 14 accommodates an angular misalignment with the socket. For the embodiment of the connecting means 12 shown in FIG. 1, a crowned square 21 at the rear portion of the plug 14 which is provided with a spherical thrust button 29 and is retained in a square socket 16, is a spherical surface which bears against a plate 19 in the bottom of the square socket 16 to allow the plug 14 to oscillate without binding.

I wish it to be understood that I do not desire to be limited to exact details of construction shown and described, for obvious modifications will occur to a person skilled in the art.

Having thus described the invention, what I claim as new and desire to be secured by Letters Patent, is as follows:

1. A coupling, for use in self-engaging and subsequently aligning two portions of a transmission for remote coupling of said portions,
comprising in combination;
a plug having a plug axis of rotation;
means establishing a socket, said socket having a socket axis of rotation; transmission means intermediate the front portion of said plug and said socket operable for interengaging said plug and socket for torque transmission therebetween when said front portion of said plug is disposed in said socket irrespective of whether said axes are aligned, or non-aligned at an acute angle relative to each other, and
guide means in the form of a guiding funnel extending beyond said socket operable for guiding the front portion of said plug towards the socket when there is a relatively large non-alignment between the plug and socket axes.

2. A coupling, as claimed in claim 1, further comprising connecting means for connecting said transmission to a driving means.

3. A coupling, as claimed in claim 2, wherein said connecting means comprises in combination, said plug including a crowned prismatic rear portion provided with a thrust button and a matching prismatic cavity defined in said driving means and retaining said prismatic portion.

4. A coupling, as claimed in claim 1, wherein said front portion of said plug comprises a crowned prismatic shape and said socket comprises a matching prismatically shaped cross-section said prismatic shapes constituting said transmission means.

5. A coupling, as claimed in claim 1, wherein said plug comprises a frontal taper to facilitate entry of said plug into said socket.

6. A coupling, as claimed in claim 4, wherein said plug prismatic frontal shape is square and said socket cross-section includes at least one matching square.

7. A coupling, as claimed in claim 3, wherein said crowned prismatic rear portion is square shaped.

8. A coupling, as claimed in claim 2, wherein said connecting means comprises said plug including a crowned prismatic rear portion and a matching prismatic cavity;
said transmission means comprising a crowned prismatic shape formed on said front portion of said plug
and a matching prismatically shaped cross-section; formed in said socket
and the crowning on the plug matches and is commensurate in amount with the crowning on the prismatic portion.

9. A coupling, for use in self-engaging and subsequently aligning two portions of a transmission for remote coupling of said portions,
comprising in combination:
a plug having a plug axis of rotation;
means establishing a socket, said socket having a socket axis of rotation;
transmission means intermediate the front portion of said plug and said socket operable for interengaging said plug and socket for torque transmission therebetween when said front portion of said plug is disposed in said socket irrespective of whether said axes are aligned, or non-aligned at an acute angle relative to each other;
guide means in the form of a guiding funnel extending beyond said socket operable for guiding the front portion of said plug towards the socket when there is a relatively large non-alignment between the plug and socket axes; and
connecting means for connecting said transmission to a driving means, comprising an Oldham type coupling.

10. A coupling, for use in self-engaging and subsequently aligning two portions of a transmission for remote coupling of said portions,
comprising in combination:
a plug having a plug axis of rotation;
means establishing a socket, said socket having a socket axis of rotation;
transmission means intermediate the front portion of said plug and said socket operable for interengaging said plug and socket for torque transmission therebetween when said front portion of said plug is disposed in said socket irrespective of whether said axes are aligned, or non-aligned at an acute angle relative to each other, and
guide means in the form of a guiding funnel extending beyond said soecket operable for guiding the front portion of said plug towards the socket when there is a relatively large non-alignment between the plug and socket axes;
said socket defining at least one opening to permit the outflow of water and debris as the front portion of said plug engages and enters the socket.

* * * * *